(12) United States Patent
Wardle et al.

(10) Patent No.: US 8,714,952 B2
(45) Date of Patent: May 6, 2014

(54) SYSTEM AND METHOD FOR MANUFACTURING CYLINDRICAL FOAM ARTICLES

(75) Inventors: Trevor Wardle, Ashland, KY (US); Russell Lee Schoenherr, Sarasota, FL (US); Donald William Zwiefka, Ludington, MI (US)

(73) Assignee: Floracraft Corp., Ludington, MI (US)

( * ) Notice: Subject to any disclaimer, the term of this patent is extended or adjusted under 35 U.S.C. 154(b) by 0 days.

(21) Appl. No.: 13/480,828

(22) Filed: May 25, 2012

(65) Prior Publication Data

US 2012/0313280 A1 Dec. 13, 2012

Related U.S. Application Data

(60) Provisional application No. 61/520,528, filed on Jun. 13, 2011.

(51) Int. Cl.
*B29C 44/26* (2006.01)
*B29C 44/50* (2006.01)
*B29C 44/54* (2006.01)

(52) U.S. Cl.
USPC ........ 425/4 C; 425/380; 425/382.4; 425/467; 425/817 C; 425/569

(58) Field of Classification Search
USPC ........ 425/4 C, 817 C, 4 R, 325, 326.1, 376.1, 425/380, 382.4, 467, 817 R, 185, 192 R, 425/461, 465, 567, 568, 569
See application file for complete search history.

(56) References Cited

U.S. PATENT DOCUMENTS

| 3,461,496 A | * | 8/1969 | Winstead | 425/4 R |
| 3,670,059 A | * | 6/1972 | Winstead | 264/48 |
| 3,789,095 A | * | 1/1974 | Winstead | 264/51 |
| 3,857,914 A | * | 12/1974 | Aishima et al. | 264/45.5 |

(Continued)

FOREIGN PATENT DOCUMENTS

| JP | 61-297119 A | 12/1986 |
| JP | 07266402 A | 10/1995 |
| JP | 2007160568 A | 6/2007 |
| JP | 2007176168 A | 7/2007 |

OTHER PUBLICATIONS

International Search Report and Written Opinion of the International Searching Authority for International Application No. PCT/US2006/039753 dated Feb. 21, 2007.

*Primary Examiner* — Seyed Masoud Malekzadeh
(74) *Attorney, Agent, or Firm* — Harness, Dickey & Pierce, P.L.C.

(57) ABSTRACT

A system may include a die, an outlet adaptor and a die outlet. The die may include a die flow channel extending from a first end to a second end of the die and coupled to a die housing of an extruder. The outlet adaptor is receivable within the die flow channel and includes first and second ends and an outlet flow channel. The first end of the outlet adaptor cooperates with the die flow channel at the second end of the die to retain the outlet adaptor. A diameter of the outlet flow channel expands at the second end of the outlet adaptor to create a pressure drop to form the foamed article. The die outlet assembly is coupled to the outlet adaptor and includes a bore that receives a polymer from the outlet adaptor. The die outlet assembly produces a cylindrical foam article having a natural skin.

13 Claims, 7 Drawing Sheets

(56) References Cited

U.S. PATENT DOCUMENTS

| | | | |
|---|---|---|---|
| 3,936,519 A * | 2/1976 | Crystal | 264/46.1 |
| 3,956,438 A * | 5/1976 | Schippers | 264/46.1 |
| 4,364,722 A * | 12/1982 | Phipps | 425/192 R |
| 4,393,017 A * | 7/1983 | Kim et al. | 264/53 |
| 4,401,612 A * | 8/1983 | Nehmey et al. | 264/53 |
| 4,419,309 A * | 12/1983 | Krutchen | 264/53 |
| 4,466,933 A * | 8/1984 | Huggard | 264/54 |
| 4,521,541 A * | 6/1985 | Rutherford et al. | 521/79 |
| 4,536,357 A * | 8/1985 | Hayashi et al. | 264/53 |
| 4,548,775 A * | 10/1985 | Hayashi et al. | 264/45.5 |
| 4,552,708 A * | 11/1985 | Kimura et al. | 264/53 |
| 4,626,183 A * | 12/1986 | Shirai et al. | 425/68 |
| 4,931,236 A * | 6/1990 | Hettinga | 264/41 |
| 4,931,237 A * | 6/1990 | Peelman et al. | 264/48 |
| 5,045,254 A * | 9/1991 | Peelman et al. | 264/48 |
| 5,124,096 A * | 6/1992 | Brambilla | 264/45.5 |
| 5,132,062 A * | 7/1992 | Brambilla | 264/45.5 |
| 5,474,722 A * | 12/1995 | Woodhams | 264/45.3 |
| 5,866,053 A * | 2/1999 | Park et al. | 264/50 |
| 6,183,673 B1 * | 2/2001 | Hartman | 264/45.9 |
| 7,186,102 B2 * | 3/2007 | Laver et al. | 425/4 C |
| 7,736,579 B2 * | 6/2010 | Gregg et al. | 264/519 |
| 7,883,649 B2 * | 2/2011 | Guerra et al. | 264/50 |
| 8,382,464 B2 * | 2/2013 | Keller et al. | 425/192 R |
| 2002/0048614 A1 | 4/2002 | Kitayama et al. | |

\* cited by examiner

SYSTEM AND METHOD FOR MANUFACTURING CYLINDRICAL FOAM ARTICLES

CROSS-REFERENCE TO RELATED APPLICATIONS

This application claims the benefit of U.S. Provisional Application No. 61/520,528, filed on Jun. 13, 2011. The disclosure of the above application is incorporated herein by reference.

INTRODUCTION

Closed and open cell foam can be used in various commercial and industrial applications as insulation. Generally, the foam product can be manufactured into rectangular or square blocks of various lengths. The rectangular or square blocks can then be fabricated into shapes that match the contours of the product to be insulated. In the example of insulation for cylindrical pipes, the rectangular blocks can be cut to make semi-circular cylinders that fit over the outside of the pipe to be insulated. The amount of waste foam generated from these current methods is significant.

The present teachings relate to a system and method for the manufacture of cylindrical foam articles, such as cylindrical pipe insulation.

SUMMARY

According to various aspects, provided is a method for producing a cylindrical foam article. The method can include coupling a first end of an outlet adaptor to a die, and coupling the die to a die housing of an extruder. The method can also include coupling a substantially cylindrical die outlet to a second end of the outlet adaptor, and substantially continuously extruding a polymer through the outlet adaptor into the die outlet to create the cylindrical foam article with a natural skin formed about a perimeter of the cylindrical foam article.

Further provided is a system for producing a cylindrical foam article, which can include a die releasably coupled to a die housing of an extruder. The system can include an outlet adaptor receivable within the die and configured create a pressure drop to cause the formation of the foamed article. The system can include a die outlet assembly couplable to the outlet adaptor. The die outlet assembly can have a substantially conical shape and at least one surface lined with a low friction material. The die outlet assembly can produce a cylindrical foam article having a natural skin.

Also provided is a system for producing a cylindrical foam article. The system can include an extruder for continuously extruding a polymer having a die housing, and a die releasably coupled to the die housing. The system can also include an outlet adaptor having a first end receivable within the die and a second end configured to create a pressure drop to cause the formation of the foamed article. The system can include a flow outlet having a first end coupled to the second end of the outlet adaptor and a second end. The flow outlet can have an inner liner with a low friction surface for contacting the foam article. The low friction surface can have a substantially conical shape. The system can also include a die outlet having a first end couplable to the second end of the flow outlet. The die outlet can have a low friction lining for contacting the foam article and the low friction lining can have a substantially conical shape. The die outlet assembly can produce the cylindrical foam article having a natural skin about a circumference of the foam article.

Further areas of applicability will become apparent from the description provided herein. It should be understood that the description and specific examples are intended for purposes of illustration only and are not intended to limit the scope of the present teachings.

DRAWINGS

The drawings described herein, which are generally drawn to scale, are for illustration purposes only and are not intended to limit the scope of the present teachings in any way.

DESCRIPTION OF VARIOUS ASPECTS

Figure 1:
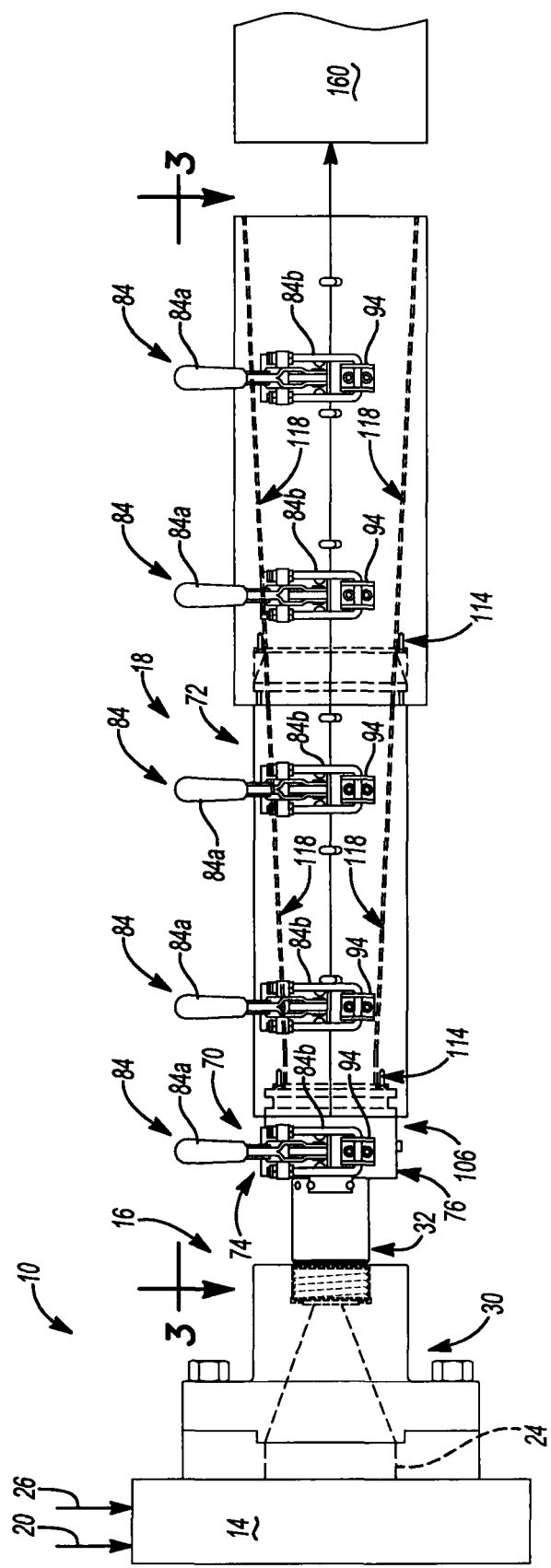
FIG. 1 is a schematic illustration of an exemplary system for manufacturing cylindrical foam articles according to the present teachings.

The following description is merely exemplary in nature and is not intended to limit the present teachings, application, or uses. It should be understood that throughout the drawings, corresponding reference numerals indicate like or corresponding parts and features. Although the following description is related generally to a system for manufacturing cylindrical products, it will be understood that the teachings associated with the system as described and claimed herein can be used to form products with any desired shape, such as elliptical, rectangular, etc. Therefore, it will be understood that the following discussions are not intended to limit the scope of the present teachings and claims herein.

It will also be understood that the various dimensions set forth herein are used to describe a particular embodiment and that the present teachings are not limited to this particular embodiment. In this regard, the various dimensions may be adapted for specific uses within the scope of the present teachings.

With reference to FIGS. 1-6, a system 10 for manufacturing a foam article 12 (FIG. 5) is shown. In one example, the foam article 12 can be comprised of polystyrene foam. The polystyrene can be obtained in virgin form from suppliers such as Total Petrochemicals, Inc. of Houston, Tex. It should be noted that the use of polystyrene is merely exemplary, as any suitable polymer could be employed to form the foam article 12, such as polyethylene. The system 10 can be used to substantially continuously extrude the polystyrene into the foam article 12, which in one example, can be used as cylindrical pipe insulation. It should be noted that although the system 10 is described herein as being used to produce pipe insulation, the resulting use of the solid cylindrical product need not be limited to pipe insulation. Rather, the solid cylindrical product could be used as intermediate product to render floral products, craft products, etc.

With reference to FIG. 1, the system 10 can include an extruder 14, a die assembly 16 and a die outlet assembly 18. It should be noted that the measurements and dimensions provided herein are merely exemplary, as the measurements and dimensions could vary to result in a foamed article of a different size. Thus, these measurements and dimensions are not intended to limit the scope of the present disclosure.

The extruder 14 can comprise any suitable plastic extruder for use with virgin and recycled polystyrene. In one example, the extruder 14 can comprise a tandem extruder. As the extruder 14 can be commercially available from vendors such as Bersthoff of German or CCM of Taiwan, the extruder 14 will not be discussed in great detail herein. Briefly, however, the extruder 14 can include an inlet 20. The virgin and recycled polystyrene can be fed into the extruder 14 though the inlet 20. The virgin and recycled polystyrene can then be moved through the extruder 14 by a suitable drive mechanism, such as at least one screw drive. A portion of the extruder 14 can be heated to plasticize the polystyrene, and then a blowing agent 26 can be introduced to mix with the melted polystyrene. In one example, the blowing agent 26 can comprise a mixture of ethyl chloride, butane and 1,1-difluoroethane (HFC-152a). For example, the blowing agent 26 can comprise about 15% to about 35% of ethyl chloride, about 20% to about 40% of butane and about 35% to about 55% of HFC-152a. It will be understood that other ratios may be used within the scope of the present teachings. The blowing agent 26 can cause the formation of large cells within the polystyrene foam. The blowing agent 26 and melted polystyrene mixture can flow from an outlet 24 of the extruder 14 to the die assembly 16.

Figure 2:
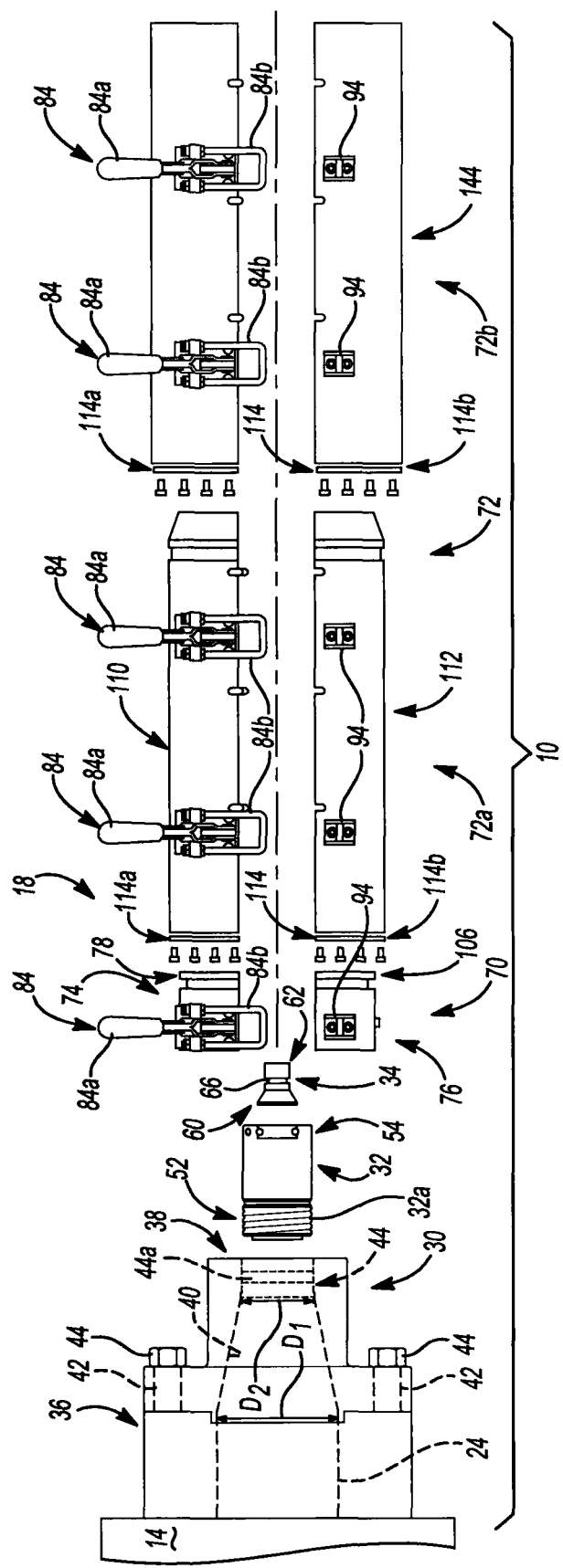
FIG. 2 is a partially exploded view of the system of FIG. 1.
Figure 2B:
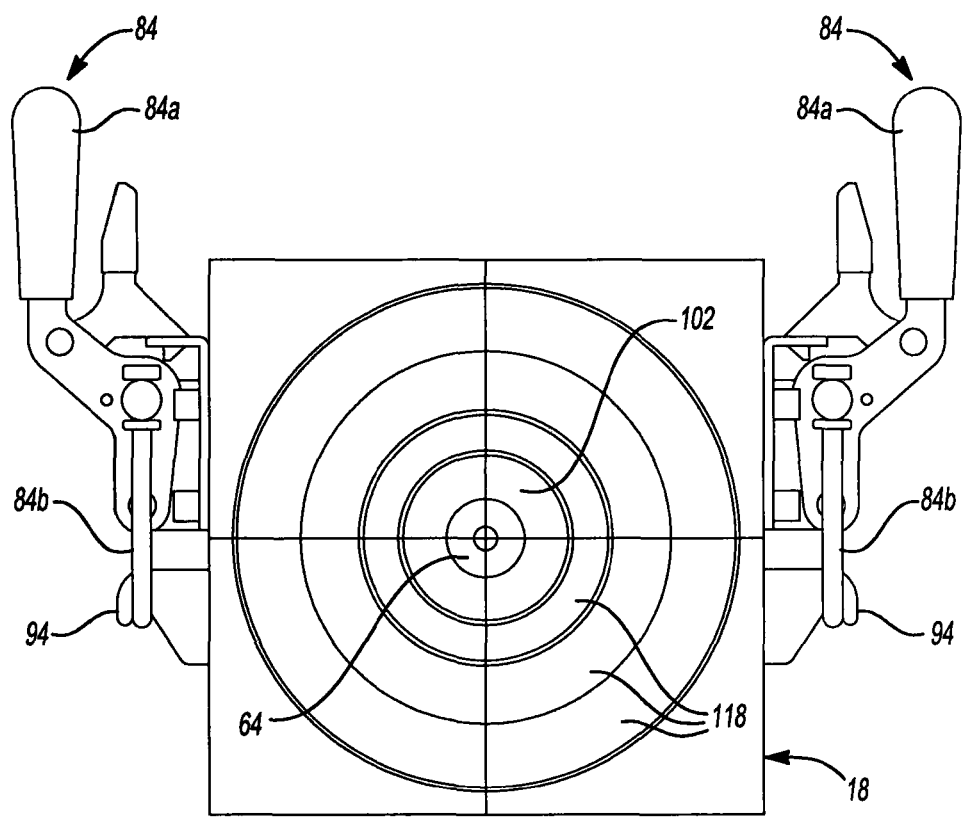
FIG. 2B is an end view of the system of FIG. 1.

With reference to FIGS. 1 and 2, the die assembly 16 can include a die housing 30, a die 32 and an outlet adaptor 34 (FIG. 2). The blowing agent 26 and melted polystyrene mixture can move or flow through the die housing 30, the die 32 and outlet adaptor 34 into the die outlet assembly 18. The die housing 30 can be coupled directly to the extruder 14. With reference to FIG. 2, the die housing 30 can include a first side 36, a second side 38 and a flow channel 40. The die housing 30 can be composed of any suitable material, such as a metal or metal alloy.

The first side 36 of the die housing 30 can be positioned adjacent to the extruder 14. The die housing 30 can be substantially cylindrical and can include a flange that defines at least one bore 42. The at least one bore 42 can receive a fastener 44 to couple the die housing 30 to the extruder 14. In one example, the at least one bore 42 can comprise a plurality of bores 42, which can be spaced about a circumference of the die housing 30. Generally, the bores 42 can be clustered in groups of two bores 42, and the groups of two bores 42 can be substantially evenly spaced about the circumference of the die housing 30, however, any configuration could be employed to couple the die housing 30 to the extruder 14.

The second side 38 of the die housing 30 can extend outwardly from the flange of the first side 36 of the die housing 30. The second side 38 can include a counterbore 44. The counterbore 44 can cooperate with the die 32 to removably couple the die 32 to the die housing 30. In one example, the counterbore 44 can include a plurality of threads 44a. The die 32 can include a plurality of mating threads 32a, which can engage the plurality of threads 44a to threadably couple the die 32 to the die housing 30.

Figure 3:
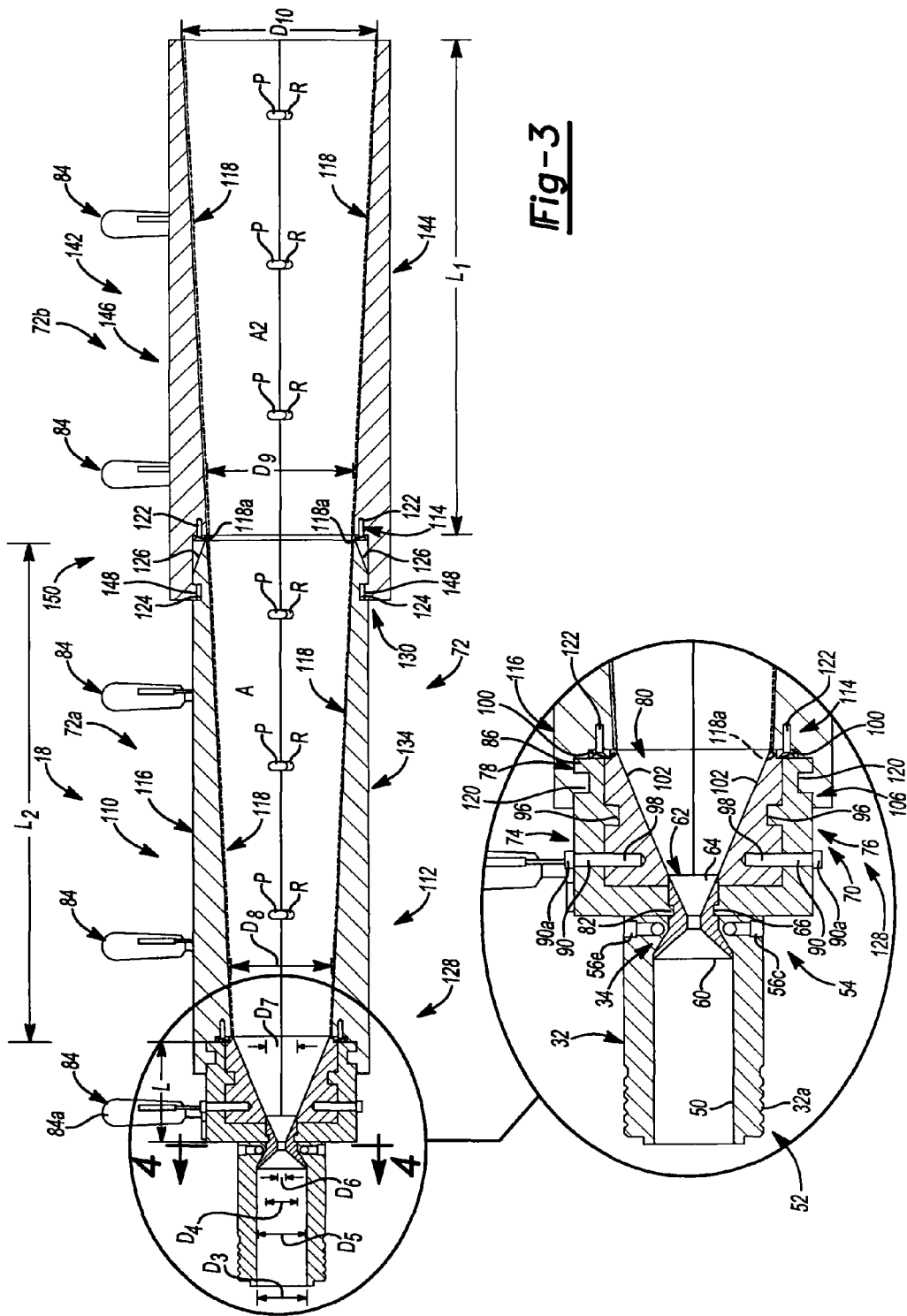
FIG. 3 is a cross-sectional view of the system of FIG. 1, taken along line 3-3 of FIG. 1.

The flow channel 40 can be in communication with the outlet 24 of the extruder 14. The flow channel 40 can have a first end 46 and a second end 48. The first end 46 can have a first diameter D1 and can taper to a second diameter D2 at the second end 48. The first diameter D1 can be substantially the same as a diameter of the outlet 24 of the extruder 14, and the second diameter D2 can be substantially the same as a third diameter D3 of a die flow channel 50 of the die 32 (FIG. 3). In one non-limiting example, the first diameter D1 can range from about 5.00 inches (in.) to about 5.5 in. and the second diameter D2 can range from about 1.75 in. to about 2.25 in. With reference to FIG. 3, the third diameter D3 of the die 32 can range from about 1.75 in. to about 2.25 in.

The die 32 can include the die flow channel 50, which can be defined from the first end 52 to a second end 54. The die flow channel 50 can include the third diameter D3 at the first end 52, which can taper to a fourth diameter D4 at the second end 54. In one example, the fourth diameter D4 can range from about 1.00 in. to about 1.50 in. The flow channel 50 can taper from the third diameter D3 to the fourth diameter D4 at an angle ranging between about 25 degrees to about 35 degrees from a centerline of the die 32. The decrease in diameter along the die flow channel 50 from the third diameter D3 and the fourth diameter D4 can pressurize the mixture of the melted polystyrene and blowing agent 26.

Figure 4:
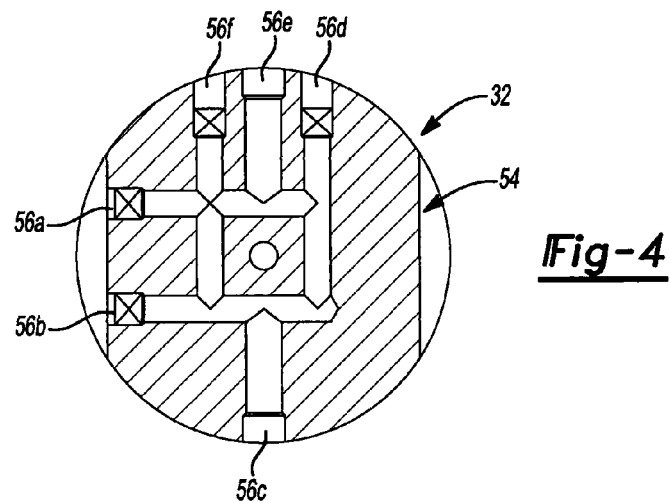
FIG. 4 is a cross-sectional view of the system of FIG. 3, taken along line 4-4 of FIG. 3.
Figure 5:
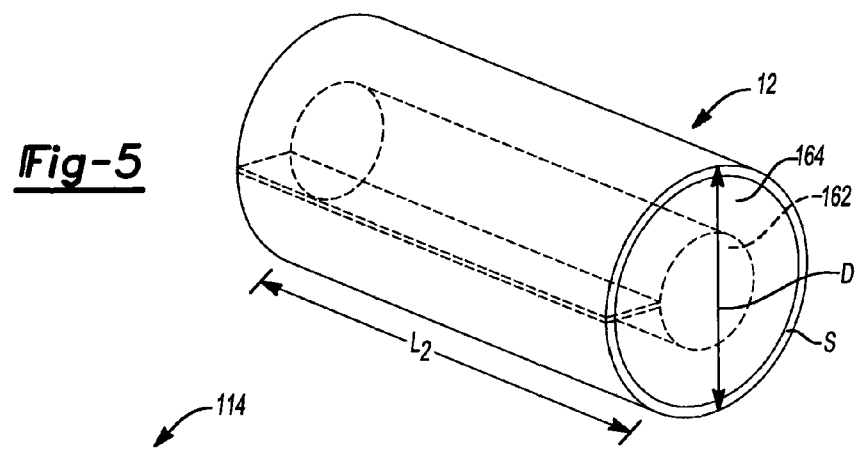
FIG. 5 is a perspective view of the cylindrical foam article produced by the system of FIG. 1.

The first end 52 of the die 32 can be removably coupled to the die housing 30. The first end 52 can include the plurality of threads 32a formed about an exterior circumference of the die 32 at the first end 52. The second end 54 can be coupled to the outlet adaptor 34, and can include at least one or a plurality of cooling channels 56. In one example, with reference to FIG. 4, the second end 54 can include six cooling channels 56a-56f, which can receive coolant to cool the mixture of melted polystyrene and blowing agent 26. The cooling channels 56 can be formed in any desired pattern through the second end 54 to enable the flow of coolant around the die flow channel 50 at the second end 54, and thus, the configuration illustrated in FIG. 4 is merely exemplary.

Generally, with reference to FIGS. 2-3, the outlet adaptor 34 can be received within the die flow channel 50 at the second end 54. The outlet adaptor 34 can have a first end 60, a second end 62 and an outlet flow channel 64 (FIG. 3) defined through the outlet adaptor 34 from the first end 60 to the second end 62. The first end 60 can be received within the die flow channel 50. The first end 60 can be substantially conical. The conical shape of the first end 60 can cooperate with the shape of the die flow channel 50 at the second end to assist in retaining the outlet adaptor 34 within the die 32. The second end 62 can be substantially cylindrical and can include an exterior groove 66. The exterior groove 66 can cooperate with the die outlet assembly 18 to couple the die outlet assembly 18 to the outlet adaptor 34 as will be discussed in greater detail herein.

The outlet flow channel 64 can be substantially conical at the first end 60. In one example, the outlet flow channel 64 at the first end 60 can taper from a diameter D5 to a diameter D6. The diameter D5 can range from about 1.80 in. to about 2.10 in., and the diameter D6 can range from about 0.25 in. to about 0.50 in. The change in size between the diameter D5 and the diameter D6 can pressurize the melted polystyrene and blowing agent 26 mixture.

The outlet flow channel 64 can also be substantially conical at the second end 62. The outlet flow channel 64 at the second end 62 can expand from the diameter D6 to a diameter D7. The diameter D7 can range from about 1.00 in. to about 1.50 in. The change in size between the diameter D6 and the diameter D7 can cause a drop in pressure, which can cause the blowing agent 26 to expand and create the foam article 12. The foam can expand to conform to an area A defined by the die outlet assembly 18. As the foam expands a natural skin S can form on the exterior of the foam article 12, as will be discussed in greater detail herein.

With reference to FIGS. 2-3, the die outlet assembly 18 can be configured to shape the foam into the foam article 12. The die outlet assembly 18 can include a flow outlet 70 and at least one die outlet 72. The flow outlet 70 can be coupled to the outlet adaptor 34, and can have a length L ranging from about 3.70 in. to about 4.10 in. (FIG. 3). Generally, the flow outlet 70 can comprise a first flow outlet half 74 and a second flow outlet half 76. The first flow outlet half 74 and second flow outlet half 76 can be clamped together about the second end 62 of the outlet adaptor 34. It should be noted that although the flow outlet 70 is described and illustrated herein as comprising two halves, the flow outlet 70 could be integrally formed if desired.

With reference to FIG. 3, the first flow outlet half 74 can have an outer shell 78 and an inner liner 80. The outer shell 78 can be substantially rectangular. The outer shell 78 can include an engagement feature 82, a clamp 84, a coupling groove 86, a coupling projection 88 and at least one bore 90. The engagement feature 82 can include a lip, which can project outwardly and can be sized to engage the exterior groove 66 of the outlet adaptor 34. The engagement between the engagement feature 82 and the exterior groove 66 can assist in clamping the first flow outlet half 74 and second flow outlet half 76 to the outlet adaptor 34.

The clamp 84 can be fixedly coupled to the first flow outlet half 74, and can cooperate with a latch 94 on the second flow outlet half 76 to clamp the first flow outlet half 74 and the second flow outlet half 76 together. In one example, the clamp 84 can comprise a 2000 lb pull action latch clamp, commercially available from De-Sta-Co of Auburn Hills, Mich. As the clamp 84 is commercially available, the clamp 84 will not be discussed in great detail herein. Briefly, however, with reference to FIG. 2, the clamp 84 can include a handle 84a and a U-shaped latch arm 84b. The handle 84a can be actuated to move the latch arm 84b so that the latch arm 84b engages a latch 94 to clamp the first flow outlet half 74 to the second flow outlet half 76.

With reference to FIG. 3, the coupling groove 86 can be defined along the exterior surface of the outer shell 78. The coupling groove 86 can cooperate with the at least one die outlet 72 to couple the at least one die outlet 72 to the flow outlet 70. The coupling projection 88 can extend outwardly from an inner surface of the outer shell 78. The coupling projection 88 can mate with a coupling recess 96 formed in the inner liner 80 to aid in coupling the inner liner 80 to the outer shell 78.

The at least one bore 90 can receive a mechanical fastener, such as a bolt 90a, to couple the outer shell 78 to the inner liner 80. Generally, the inner liner 80 can include at least one bore 98, which can be coaxially aligned with the at least one bore 90 to receive the bolt 90a. The at least one bore 98 can include a plurality of threads, which can threadably engage a plurality of threads formed on the bolt 90a. It should be noted that the use of the bolt 90a is merely exemplary, as any suitable mechanism could be used to couple the outer shell 78 to the inner liner 80, such as welding, rivets, etc., and further, the outer shell 78 and inner liner 80 could be integrally formed.

The inner liner 80 can have an exterior surface 100 and an interior surface 102. The exterior surface 100 can include the at least one bore 98 and the coupling recess 96. The coupling recess 96 can receive the coupling projection 88 to couple the inner liner 80 to the outer shell 78. The interior surface 102 of the inner liner 80 can contact the foam as the foam expands into the die outlet 72. As the interior surface 102 contacts the foam, the interior surface 102 can be formed of a low friction material to facilitate the expansion of the foam into the die outlet 72. In one example, the inner liner 80 can be formed of Teflon®, commercially available from E.I. du Pont de Nemours and Company of Wilmington, Del. However, the inner liner 80 could be composed of ceramic or other low friction material. Alternatively, the interior surface 102 could be coated with a low friction material, such as Teflon® or ceramic, if desired. As will be discussed, the interior surface 102 of the first flow outlet half 74 can cooperate with the interior surface 102 of the second flow outlet half 76 to enable the expansion of the foam into the die outlet 72.

As the second flow outlet half 76 can be substantially similar to the first flow outlet half 74, the same reference numerals will be used to describe the same or similar components. The second flow outlet half 76 can have an outer shell 106 and the inner liner 80. The outer shell 106 can be substantially rectangular. The outer shell 106 can include the engagement feature 82, the coupling groove 86, the coupling projection 88, the at least one bore 90 and the latch 94 (FIG. 2). The latch 94 can be coupled to the exterior surface of the second flow outlet half 76, and can cooperate with the latch arm 84b to enable the clamp 84 to clamp the first flow outlet half 74 to the second flow outlet half 76.

With the first flow outlet half 74 coupled to the second flow outlet half 76, the interior surfaces 102 of each of the first flow outlet half 74 and the second flow outlet half 76 can define the area A for expansion of the foam article 12, as illustrated in FIG. 3. The interior surfaces 102 can cooperate to define a substantially conical area, which can transition from the diameter D7 to a diameter D8. The diameter D8 can range from about 3.70 in. to about 4.10 in, for example. The foam can flow from the flow outlet 70 to the at least one die outlet 72.

The at least one die outlet 72 can be coupled to the flow outlet 70. Depending on the desired diameter size of the foam article 12, the one or more die outlets 72 can be used. In the example of the foam article 12 having a diameter D (FIG. 5) of about 8 in., two die outlets 72a, 72b can be used. The first die outlet 72a can include a first die outlet half 110, a second die outlet half 112 and a retaining ring 114. The retaining ring 114 functions to hold the Teflon® liner in place. The first die outlet half 110 and the second die outlet half 112 can cooperate to define an area for expansion of the foam. It should be noted that although the first die outlet 72a is described and illustrated herein as comprising two halves, the first die outlet 72a could be integrally formed if desired.

The first die outlet half 110 can include a die shell 116 and a lining 118. The die shell 116 can include a projection 120, at least one clamp 84, a plurality of bores 122, a coupling groove 124 and a tapered end portion 126. In addition, if desired, the die shell 116 can include at least one or a plurality of dowel pins P, which can assist in coupling the first die outlet half 110 to the second die outlet half 112. The first die outlet half 110 can include two clamps 84, which can be spaced apart along a length of the die outer shell 116. The projection 120 can be arcuate, and can be formed at a first end 128 of the die outer shell 116. The projection 120 can engage the coupling groove 86 to assist in coupling the first die outlet half 110 to the flow outlet 70. The plurality of bores 122 can be formed to cooperate with the retaining ring 114 at the first end 128 of the first die outlet half 110. The plurality of bores 122 can include a plurality of threads, which can enable the retaining ring 114 to be coupled to the first die outlet half 110, as will be discussed in greater detail herein.

The coupling groove 124 can be defined near a second end 130 of the die outer shell 116. The coupling groove 124 can receive a portion of the second die outlet 72b to assist in coupling the second die outlet 72b to the first die outlet 72a. The tapered end portion 126 can be defined adjacent to the coupling groove 124 at the second end 130. The tapered end portion 126 can facilitate the engagement of the second die outlet 72b with the coupling groove 124 of the first die outlet 72a.

The lining 118 can be coupled to an interior surface 132 of the die outer shell 116. The lining 118 can comprise a low friction material, which can be secured to the die outer shell 116 via the retaining ring 114. In one example, the lining 118 can comprise a Teflon® sheet, however, any suitable low friction material could be used as a lining, such as a ceramic insert. In addition, the lining 118 could comprise a coating, if desired. Generally, the lining 118 can have a nominal thickness, however, in one example, the lining 118 can have a thickness ranging from between about 0.05 in. to about 0.1 in. The lining 118 can contact the surface of the foam article 12 and can aid in controlling the expansion of the foam article 12. Generally, an end 118a of the lining 118 can be folded over the first end 128 of the die outer shell 116, and then secured to the die outer shell 116 by the retaining ring 114.

As the second die outlet half 112 can be substantially similar to the first outlet half 110, the same reference numerals will be used to denote the same or similar components. The second die outlet half 112 can include a second die shell 134 and the lining 118. The second die shell 134 can include the projection 120, at least one latch 94 (FIG. 2), the plurality of bores 122, the coupling groove 124 and the tapered end portion 126. The second die shell 134 can also include at least one or a plurality of recesses R for receipt of the dowel pins P, if employed. The second die shell 134 can include two latches 94, which can be spaced apart along a length of the second die shell 134. The two latches 94 can cooperate with the clamps 84 of the first die outlet half 110 to couple or clamp the first die outlet half 110 to the second die outlet half 112.

Figure 6:
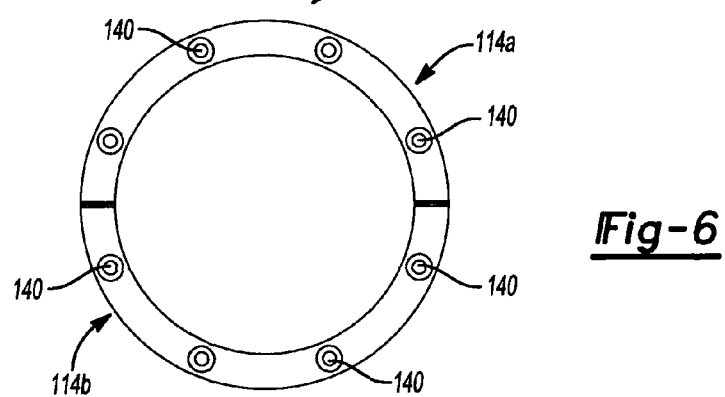
FIG. 6 is a front view of a retaining ring for use with the system of FIG. 1.

With reference to FIG. 6, the retaining ring 114 can be substantially annular, and can be formed in two discrete halves 114a, 114b. It should be noted, however, that the retaining ring 114 could be integrally formed. The first half 114a of the retaining ring 114 can couple the lining 118 to the die shell 116, and the second half 114b can couple the lining to the second die shell 134. In this regard, the retaining ring 114 can include a plurality of bores 140, which can be substantially evenly spaced about a circumference of the retaining ring 114. The plurality of bores 140 can be coaxially aligned with the corresponding plurality of bores 122 of each of the first die outlet half 110 and second die outlet half 112. A mechanical fastener, such as a bolt, can pass through a respective one of the plurality of bores 140 into a corresponding one of the plurality of bores 122 to couple the retaining ring 114 to the first die outlet half 110 and second die outlet half 112.

Referring to FIG. 3, with the first die outlet half 110 coupled to the second die outlet half 112 via the clamps 84, the area A defined between the linings 118 of each of the first die outlet half 110 and the second die outlet half 112 can allow for expansion of the foam. The linings 118 can contact the foam over a length L1 ranging from about 18.00 in. to about 22.00 in. The area A can be substantially conical, and can transition from the diameter D8 to a diameter D9. The diameter D9 can range from about 5.70 in. to about 6.00 in. The foam article 12 can flow from the first die outlet 72a to the second die outlet 72b.

As the second die outlet 72b can be substantially similar to the first die outlet 72a, the same reference numerals will be used to describe the same or similar components. The second die outlet 72b can include a third die outlet half 142, a fourth die outlet half 144 and the retaining ring 114. The third die outlet half 142 and the fourth die outlet half 144 can cooperate to define an area A2 for further expansion of the foam article 12. It should be noted that although the second die outlet 72b is described and illustrated herein as comprising two halves, the second die outlet 72b could be integrally formed if desired.

The third die outlet half 142 can include a die shell 146 and the lining 118. The die shell 146 can include a projection 148, at least one clamp 84, and the plurality of bores 122. In addition, if desired, the die shell 146 can include at least one or a plurality of dowel pins P, which can assist in coupling the third die outlet half 142 to the fourth die outlet half 144. The third die outlet half 142 can include two clamps 84, which can be spaced apart along a length of the die shell 146. The projection 148 can be arcuate, and can be formed at a first end 150 of the die shell 146. The projection 148 can engage the coupling groove 124 to assist in coupling the third die outlet half 142 to the first die outlet half 110.

The fourth die outlet half 144 can include a second die shell 152 and the lining 118. The second die shell 152 can include the projection 148, at least one latch 94 and the plurality of bores 122. The second die shell 152 can also include at least one or a plurality of recesses R for receipt of the dowel pins P, if employed. The second die shell 152 can include two latches 94 (FIG. 2), which can be spaced apart along a length of the second die shell 152. The two latches 94 can cooperate with the clamps 84 of the third die outlet half 142 to couple or clamp the third die outlet half 142 to the fourth die outlet half 144.

With the third die outlet half 142 coupled to the fourth die outlet half 144 via the clamps 84, the area A2 defined between the linings 118 of each of the third die outlet half 142 and the fourth die outlet half 144 can allow for expansion of the foam. The linings 118 can contact the foam over the length L1 ranging from about 18.00 in. to about 22.00 in. The area A2 can be substantially conical, and can transition from the diameter D9 to a diameter D10. The diameter D10 can range from about 7.70 in. to about 8.10 in. Thus, the foam article 12 can have the diameter D ranging from about 7.70 in. to about 8.20 in., depending upon the amount of expansion of the foam article 12 after exiting the second die outlet 72b. The foam article 12 can flow from the second die outlet 72b to post processing equipment 160.

Briefly, it should be noted that particular post processing equipment 160 for use with the foam article 12 is beyond the scope of the present teachings and need not be described herein. In a conventional manner insofar as the present teachings are concerned, various devices can be used to hold back and control the final expansion of the foam article 12, cool the foam article 12 and process the foam article 12 for sale. Exemplary hold back devices can also enable the foam article 12 to cool. Exemplary processing devices, which can be used to cut the foam article 12 and prepare it for sale can include conventional cut-off knives commercially available from various sources. Generally, with reference to FIG. 5, the foam article 12 produced by the first die outlet 72a and second die outlet 72b can comprise a 8 in. diameter cylindrical foamed rod, which can be cut with a hot wire to remove a central core 162 to enable the rod to fit around a desired diameter pipe. A hot wire can also be used to cut the cylindrical foamed rod to a suitable length L2, such as about 15 in. to about 65 in. long. It should be noted that the central core 162 removed from the cylindrical foamed rod can be used to make floral or craft products, used in packaging applications, etc.

The foam article 12 produced by the system 10 can have the natural skin S about the perimeter or circumference of the foam article 12. Generally, the skin S can have a thickness of about 0.05 in to about 0.25 in., substantially uniformly about the perimeter or circumference of the foam article 12. The presence of the natural skin S can allow the foam article 12 to have greater compressive and flexwall strengths. The presence of the natural skin S may also improve insulation benefits and characteristics. In this regard, the natural skin S can have a cell size that is smaller than a cell size of an interior 164 of the foamed article, resulting in a larger cell density along the skin S. In one example, the cell size of the skin S can range from about 0.008 in. to about 0.04 in., while the cell size of the interior 164 can range from about 0.04 in. to about 0.09 in. The larger density of cells along the skin S can provide for increased strength of the foam article 12, and can also raise the insulation value of the foam article 12. In addition, the cell structure of the foam article 12 can be substantially symmetrical and equivalent at any selected distance from a center of the foam article 12, which can reduce variability between lots of the foam article 12.

Figure 7:
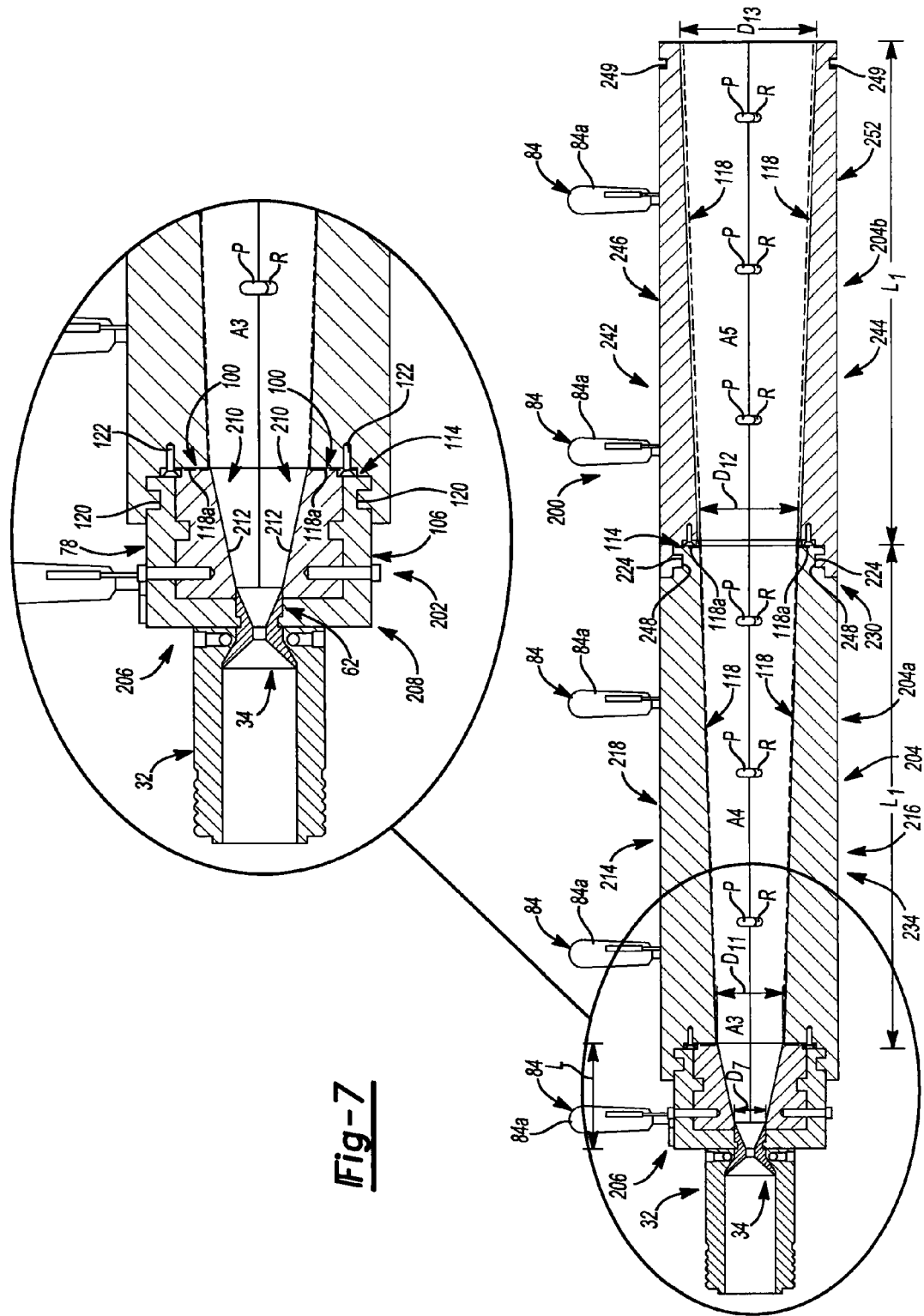
FIG. 7 is a cross-sectional view of another die outlet assembly for use with the system of FIG. 1 according to the present teachings.

With reference to FIG. 7, in one example, a die outlet assembly 200 can be employed with the system 10. The die outlet assembly 200 can be used to create the foam article 12 having the diameter D ranging from about 5.70 in. to about 6.10 in. As the die outlet assembly 200 can be similar to the die outlet assembly 18 described with reference to FIGS. 1-6, only the differences between the die outlet assembly 18 and the die outlet assembly 200 will be discussed in great detail herein, and the same reference numerals will be used to denote the same or similar components. The die outlet assembly 200 can be configured to shape the foam into the foam article 12. The die outlet assembly 200 can include a flow outlet 202 and at least one die outlet 204. The flow outlet 202 can be coupled to the outlet adaptor 34, and can have the length L ranging from about 3.70 in. to about 4.10 in., for example. Generally, the flow outlet 202 can comprise a first flow outlet half 206 and a second flow outlet half 208. The first flow outlet half 206 and second flow outlet half 208 can be clamped together about the second end 62 of the outlet adaptor 34. It should be noted that although the flow outlet 202 is described and illustrated herein as comprising two halves, the flow outlet 202 could be integrally formed if desired.

The first flow outlet half 206 can have the outer shell 78 and an inner liner 210. The inner liner 210 can have the exterior surface 100 and an interior surface 212. The interior surface 212 of the first flow outlet half 206 can cooperate with the interior surface 212 of the second flow outlet half 208 to enable the expansion of the foam into the die outlet 204. As the second flow outlet half 208 can be substantially similar to the first flow outlet half 206, the same reference numerals will be used to describe the same or similar components. The second flow outlet half 208 can have the outer shell 106 and the inner liner 210.

With the first flow outlet half 206 coupled to the second flow outlet half 208, the interior surfaces 212 of each of the first flow outlet half 206 and the second flow outlet half 208 can define an area A3 for expansion of the foam. The interior surfaces 212 can cooperate to define a substantially conical area, which can transition from the diameter D7 to a diameter D11. The diameter D11 can range from about 2.40 in. to about 2.80 in., for example. The foam can flow from the flow outlet 202 to the at least one die outlet 204.

In the example the foam article 12 having the diameter D ranging from about 5.70 in. to about 6.10 in., two die outlets 204a, 204b can be used. The first die outlet 204a can include a first die outlet half 214, a second die outlet half 216 and the retaining ring 114. The first die outlet half 214 and the second die outlet half 216 can cooperate to define an area for expansion of the foam. It should be noted that although the first die outlet 204a is described and illustrated herein as comprising two halves, the first die outlet 204a could be integrally formed if desired.

The first die outlet half 214 can include a die shell 218 and the lining 118. The die shell 218 can include the projection 120, the at least one clamp 84, the plurality of bores 122 and a coupling groove 224. In addition, if desired, the die shell 218 can include at least one or a plurality of dowel pins P, which can assist in coupling the first die outlet half 214 to the second die outlet half 216. The first die outlet half 214 can include two clamps 84, which can be spaced apart along a length of the die shell 218. The coupling groove 224 can be defined near a second end 230 of the die shell 218. The coupling groove 224 can receive a portion of the second die outlet 200b to assist in coupling the second die outlet 200b to the first die outlet 200a.

As the second die outlet half 216 can be substantially similar to the first die outlet half 214, the same reference numerals will be used to denote the same or similar components. The second die outlet half 216 can include a second die shell 234 and the lining 118. The second die shell 234 can include the projection 120, the at least one latch 94, the plurality of bores 122 and the coupling groove 224. The second die shell 234 can also include at least one or a plurality of recesses R for receipt of the dowel pins P, if employed. The second die shell 234 can include two latches 94, which can cooperate with the clamps 84 of the first die outlet half 214 to couple or clamp the first die outlet half 214 to the second die outlet half 216.

With the first die outlet half 214 coupled to the second die outlet half 216 via the clamps 84, an area A4 defined between the linings 118 of each of the first die outlet half 214 and the second die outlet half 216 can allow for expansion of the foam. The linings 118 can contact the foam over the length L1 ranging from about 18.00 in. to about 22.00 in., for example. The area A4 can be substantially conical, and can transition from the diameter D11 to a diameter D12. The diameter D12 can range from about 3.70 in. to about 4.10 in., for example. The foam article 12 can flow from the first die outlet 204a to the second die outlet 204b.

As the second die outlet 204b can be substantially similar to the first die outlet 204a, the same reference numerals will be used to describe the same or similar components. The second die outlet 204b can include a third die outlet half 242, a fourth die outlet half 244 and the retaining ring 114. The third die outlet half 242 and the fourth die outlet half 244 can cooperate to define an area A5 for expansion of the foam article 12. It should be noted that although the second die outlet 204b is described and illustrated herein as comprising two halves, the second die outlet 204b could be integrally formed if desired.

The third die outlet half 242 can include a die shell 246 and the lining 118. The die shell 246 can include a projection 248, at least one clamp 84, the plurality of bores 122 and a groove 249. In addition, if desired, the die shell 246 can include at least one or a plurality of dowel pins P, which can assist in coupling the third die outlet half 2442 to the fourth die outlet half 244. The third die outlet half 142 can include two clamps 84, which can be spaced apart along a length of the die shell 146. The projection 248 can be arcuate, and can be formed at a first end 250 of the die shell 246. The projection 248 can engage the coupling groove 224 to assist in coupling the third die outlet half 242 to the first die outlet half 214. The groove 249 can enable the third die outlet half 242 to be coupled to another die outlet half, such as the third die outlet half 142.

The fourth die outlet half 244 can include a second die shell 252 and the lining 118. The second die shell 252 can include the projection 148, at least one latch 94, the plurality of bores 122 and the groove 249. The second die shell 252 can also include at least one or a plurality of recesses R for receipt of the dowel pins P, if employed. The second die shell 252 can include two latches 94, which can cooperate with the clamps 84 of the third die outlet half 242 to couple or clamp the third die outlet half 242 to the fourth die outlet half 244. The groove 249 can enable the fourth die outlet half 244 to be coupled to another die outlet half, such as the fourth die outlet half 144.

With the third die outlet half 242 coupled to the fourth die outlet half 244 via the clamps 84, the area A5 defined between the linings 118 of each of the third die outlet half 242 and the fourth die outlet half 244 can allow for expansion of the foam. The linings 118 can contact the foam over the length L1 ranging from about 18.00 in. to about 22.00 in., for example. The area A5 can be substantially conical, and can transition from the diameter D12 to a diameter D13. The diameter D13 can range from about 5.70 in. to about 6.00 in., for example. Thus, the foam article 12 can have a diameter D ranging from about 5.70 in. to about 6.20 in., for example, depending upon the amount of expansion of the foam article 12 after exiting the second die outlet 204b. The foam article 12 can flow from the second die outlet 204b to post processing equipment 160.

Figure 8:
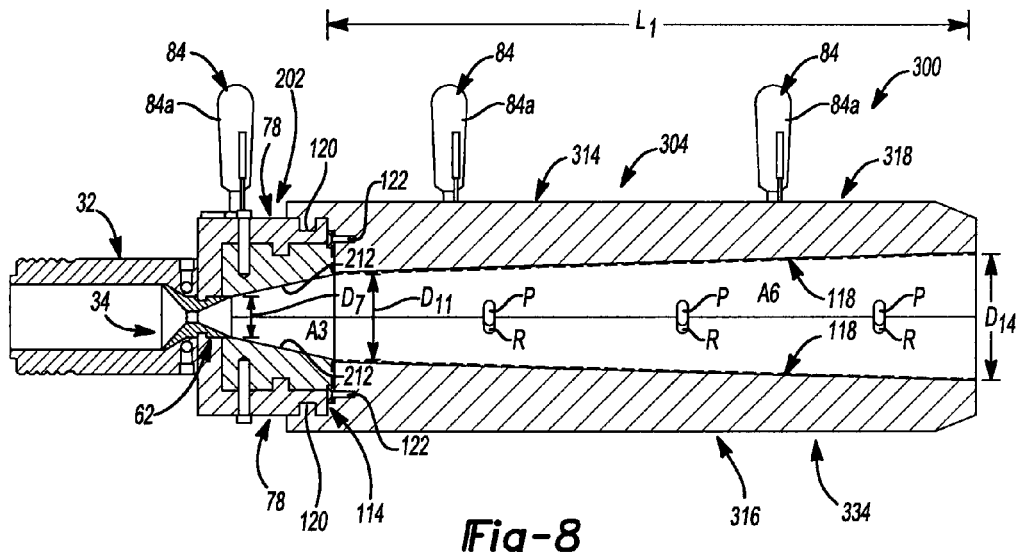
FIG. 8 is a cross-sectional view of another die outlet assembly for use with the system of FIG. 1 according to the present teachings.

With reference to FIG. 8, in one example, a die outlet assembly 300 can be employed with the system 10. The die outlet assembly 300 can be used to create the foam article 12 having the diameter D ranging from about 3.70 in. to about 4.10 in. As the die outlet assembly 300 can be similar to the die outlet assembly 200 described with reference to FIG. 7, only the differences between the die outlet assembly 200 and the die outlet assembly 300 will be discussed in great detail herein, and the same reference numerals will be used to denote the same or similar components. The die outlet assembly 300 can be configured to shape the foam into the foam article 12. The die outlet assembly 300 can include the flow outlet 202 and at least one die outlet 304. The flow outlet 202 can be coupled to the outlet adaptor 34, and the foam can flow from the flow outlet 202 to the at least one die outlet 304.

In the example of the foam article 12 having the diameter D ranging from about 3.70 in. to about 4.10 in., a single die outlet 304 can be used. The die outlet 304 can include a first die outlet half 314, a second die outlet half 316 and the retaining ring 114. The first die outlet half 314 and the second die outlet half 316 can cooperate to define an area A6 for expansion of the foam article 12. It should be noted that although the die outlet 304 is described and illustrated herein as comprising two halves, the die outlet 304 could be integrally formed if desired.

The first die outlet half 314 can include a die shell 318 and the lining 118. The die shell 318 can include the projection 120, the at least one clamp 84 and the plurality of bores 122. In addition, if desired, the die shell 318 can include at least one or a plurality of dowel pins P, which can assist in coupling the first die outlet half 314 to the second die outlet half 316. The first die outlet half 314 can include two clamps 84, which can be spaced apart along a length of the die shell 318. As the second die outlet half 316 can be substantially similar to the first die outlet half 314, the same reference numerals will be used to denote the same or similar components. The second die outlet half 316 can include a second die shell 334 and the lining 118. The second die shell 334 can include the projection 120, the at least one latch 94 and the plurality of bores 122. The second die shell 334 can also include at least one or a plurality of recesses R for receipt of the dowel pins P, if employed. The second die shell 334 can include two latches 94, which can cooperate with the clamps 84 of the first die outlet half 314 to couple or clamp the first die outlet half 314 to the second die outlet half 316.

With the first die outlet half 314 coupled to the second die outlet half 316 via the clamps 84, the area A6 defined between the linings 118 of each of the first die outlet half 314 and the second die outlet half 316 can allow for expansion of the foam article 12. The linings 118 can contact the foam over the length L1 ranging from about 18.00 in. to about 22.00 in., for example. The area A6 can be substantially conical, and can transition from the diameter D11 to a diameter D14. The diameter D14 can range from about 3.70 in. to about 4.10 in., for example. The foam can flow from the die outlet 304 to the post processing equipment 160.

Figure 9:
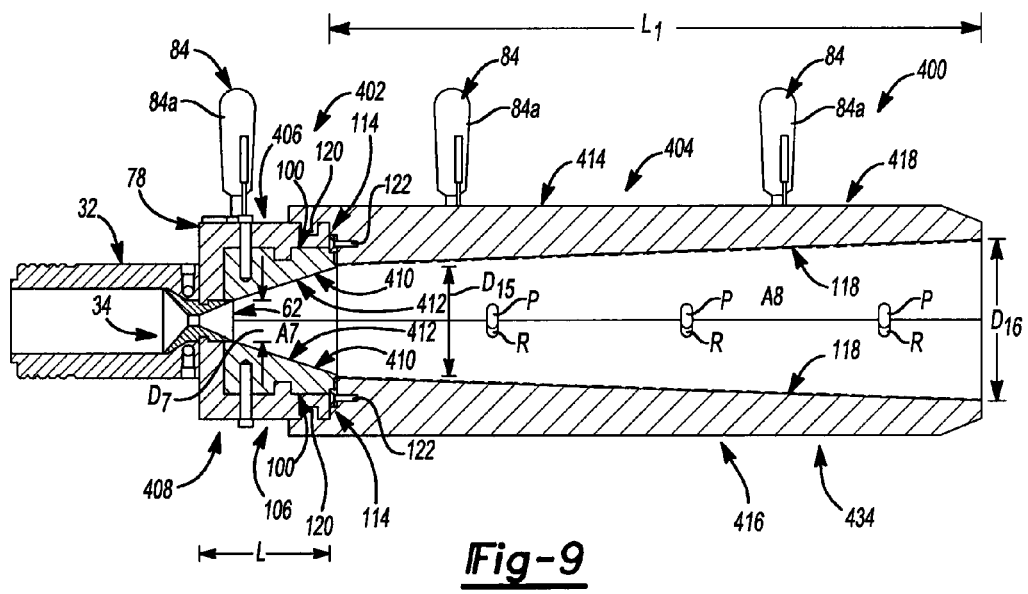
FIG. 9 is a cross-sectional view of another die outlet assembly for use with the system of FIG. 1 according to the present teachings.

With reference to FIG. 9, in one example, a die outlet assembly 400 can be employed with the system 10. The die outlet assembly 400 can be used to create the foam article 12 having the diameter D ranging from about 4.70 in. to about 5.10 in., for example. As the die outlet assembly 400 can be similar to the die outlet assembly 18 described with reference to FIGS. 1-6, only the differences between the die outlet assembly 18 and the die outlet assembly 400 will be discussed in great detail herein, and the same reference numerals will be used to denote the same or similar components. The die outlet assembly 400 can be configured to shape the foam into the foam article 12. The die outlet assembly 400 can include a flow outlet 402 and at least one die outlet 404. The flow outlet 402 can be coupled to the outlet adaptor 34, and can have the length L ranging from about 3.70 in. to about 4.10 in. Generally, the flow outlet 402 can comprise a first flow outlet half 406 and a second flow outlet half 408. The first flow outlet half 406 and second flow outlet half 408 can be clamped together about the second end 62 of the outlet adaptor 34. It should be noted that although the flow outlet 402 is described and illustrated herein as comprising two halves, the flow outlet 402 could be integrally formed if desired.

The first flow outlet half 406 can have the outer shell 78 and an inner liner 410. The inner liner 410 can have the exterior surface 100 and an interior surface 412. The interior surface 412 of the first flow outlet half 406 can cooperate with the interior surface 412 of the second flow outlet half 408 to enable the expansion of the foam into the die outlet 404. As the second flow outlet half 408 can be substantially similar to the first flow outlet half 406, the same reference numerals will be used to describe the same or similar components. The second flow outlet half 408 can have the outer shell 106 and the inner liner 410.

With the first flow outlet half 406 coupled to the second flow outlet half 408, the interior surfaces 412 of each of the first flow outlet half 406 and the second flow outlet half 408 can define an area A7 for expansion of the foam. The interior surfaces 412 can cooperate to define a substantially conical area, which can transition from the diameter D7 to a diameter D15. The diameter D15 can range from about 3.10 in. to about 3.60 in., for example. The foam can flow from the flow outlet 402 to the at least one die outlet 404.

In the example the foam article 12 having the diameter D ranging from about 4.70 in. to about 5.10 in., a single die outlet 404 can be used. The die outlet 404 can include a first die outlet half 414, a second die outlet half 416 and the retaining ring 114. The first die outlet half 414 and the second die outlet half 416 can cooperate to define an area A8 for expansion of the foam. It should be noted that although the die outlet 404 is described and illustrated herein as comprising two halves, the die outlet 404 could be integrally formed if desired.

The first die outlet half 414 can include a die shell 418 and the lining 118. The die shell 418 can include the projection 120, the at least one clamp 84 and the plurality of bores 122. In addition, if desired, the die shell 418 can include at least one or a plurality of dowel pins P, which can assist in coupling the first die outlet half 414 to the second die outlet half 416. The first die outlet half 414 can include two clamps 84, which can be spaced apart along a length of the die shell 418. As the second die outlet half 416 can be substantially similar to the first die outlet half 414, the same reference numerals will be used to denote the same or similar components. The second die outlet half 416 can include a second die shell 434 and the lining 118. The second die shell 434 can include the projection 120, the at least one latch 94 and the plurality of bores 122. The second die shell 434 can also include at least one or a plurality of recesses R for receipt of the dowel pins P, if employed. The second die shell 434 can include two latches 94, which can cooperate with the clamps 84 of the first die outlet half 414 to couple or clamp the first die outlet half 414 to the second die outlet half 416.

With the first die outlet half 414 coupled to the second die outlet half 416 via the clamps 84, the area A8 defined between the linings 118 of each of the first die outlet half 414 and the second die outlet half 416 can allow for expansion of the foam article 12. The linings 118 can contact the foam over the length L1 ranging from about 18.00 in. to about 22.00 in., for example. The area A8 can be substantially conical, and can transition from the diameter D15 to a diameter D16. In one example, the diameter D16 can range from about 4.70 in. to about 5.10 in. The foam article 12 can flow from the die outlet 404 to the post processing equipment 160.

Thus, in order to produce the foam article 12 with the selected diameter D, with the die housing 30 coupled to the extruder 14, the outlet adaptor 34 can be positioned within the die 32. Then, the die 32 can be threadably coupled to the die housing 30. The selected die outlet assembly 18, 200, 300, 400 can then be clamped to the second end 62 of the outlet adaptor 34. The raw polymer, such as polystyrene can be fed into the extruder 14. The extruder 14 can melt the polystyrene, which can then be mixed with the blowing agent 26. The mixture of the melted polystyrene and blowing agent 26 can pass through the die housing 30, into the die 32 and the outlet adaptor 34. As the mixture exits the outlet adaptor 34 into the die outlet assembly 18, 200, 300, 400, the drop in pressure can cause the blowing agent 26 within the mixture to expand. The blowing agent 26 can expand and fill the area A-A8 defined by the die outlet assembly 18, 200, 300, 400 to create the cylindrical foam article 12, which can exit the respective die outlet assembly 18, 200, 300, 400 into the post processing equipment 160. The post processing equipment 160 can control the further expansion of the foam article 12, and can process the foam article 12 for sale.

In one example, the cylindrical foam article 12 can be processed for use as pipe insulation by removing a central core 162 of the foam article 12 while leaving the natural skin S substantially about a perimeter of the foam article 12. By having the natural skin S intact about a substantial portion of the foam article 12, the foamed article can have greater compressive strengths and a higher insulation value. For example, for a foam article 12 having a diameter D of about 4.38 in., the density of the foam article 12 can be about 2.37 pounds per cubic foot. The cell size can be about 0.08 in., and the radial compressive strength can be about 21.09 pounds per square inch. The compressive strength along the length L2 of the foam article 12 can be about 26.09 pounds per square inch.

In another example of a foam article 12 having a diameter D of about 6.38 in., the density of the foam article 12 can be about 2.19 pounds per cubic foot. The cell size can be about 0.09 in., and the radial compressive strength can be about 25.85 pounds per square inch. The compressive strength along the length L2 of the foam article 12 can be about 20.01 pounds per square inch.

It should be noted that the sizes of the foam article 12 and the die outlet assembly 18, 200, 300, 400 are merely exemplary, as the diameter D of the foam article 12 could have any selected size. In addition, the coupling of the various die outlets 72a, 72b, 200a, 200b is merely exemplary, as the die outlets 72a, 72b, 200a, 200b could each be used alone to create the foam article 12 with a selected diameter D.

By manufacturing the foam article 12 as a cylinder, a substantial amount of waste is reduced when fabricating the foam article 12 into insulation, such as insulation for pipes. For example, in order to insulate a pipe with about a 6 in. diameter with an insulation thickness of about 2 in., currently about a 10.13 in. by about 10.13 in. rectangular block of foam has to be cut from about a 10 in. by about 20 in. billet. The cross sectional area of about a 10.13 in. block is about 102.5 square in. Conversely, in one example, a cross sectional area of the cylindrical foam article 12 can be pi ($\pi$) multiplied by the diameter and height of the cylinder. In the example of a cylindrical foam article 12 having a diameter of about 5 in. and a length of about 5 in., the cross section of the cylindrical foam article 12 can be about 78.55 square in. Approximately about 35% of the rectangular billet has to be removed to generate the same product created by the system 10. Thus, the use of the cylindrical foam article 12 reduces waste generated by cutting the rectangular billet into a cylinder. In addition, the cutting of the rectangular billet into a cylindrical product removes the natural skin S present on the foam, which reduces the strength and insulation value of the resulting product.

While specific examples have been described in the specification and illustrated in the drawings, it will be understood by those of ordinary skill in the art that various changes can be made and equivalents can be substituted for elements thereof without departing from the scope of the present teachings. Furthermore, the mixing and matching of features, elements and/or functions between various examples is expressly contemplated herein so that one of ordinary skill in the art would appreciate from the present teachings that features, elements and/or functions of one example can be incorporated into another example as appropriate, unless described otherwise, above. Moreover, many modifications can be made to adapt a particular situation or material to the present teachings without departing from the essential scope thereof. Therefore, it is intended that the present teachings not be limited to the particular examples illustrated by the drawings and described in the specification, but that the scope of the present teachings will include any embodiments falling within the foregoing description.

What is claimed is:

1. A system for producing a cylindrical foam article comprising:
    a die having a die flow channel extending from a first end to a second end of the die and releasably coupled to a die housing of an extruder;
    an outlet adaptor receivable within the die flow channel, wherein the outlet adaptor includes a first end, a second end and an outlet flow channel defined from the first end to the second end of the outlet adaptor such that the first end of the outlet adaptor is shaped to cooperate with a shape of the die flow channel at the second end of the die to assist in retaining the outlet adaptor and wherein a diameter of the outlet flow channel expands at the second end of the outlet adaptor to create a pressure drop to cause formation of the foamed article; and a die outlet assembly coupled to the outlet adaptor, the die outlet assembly having a substantially conical bore lined with a low friction material, the substantially conical bore configured to receive a polymer from the outlet adaptor and extending through a downstream axial end of the die outlet assembly, wherein the die outlet assembly produces the cylindrical foam article having a natural skin about a circumference of the foam article.

2. The system of claim 1, wherein the die outlet assembly produces the cylindrical foam article having a diameter ranging from about 7.70 in. to about 8.10 in.

3. The system of claim 1, wherein the die outlet assembly produces the cylindrical foam article having a diameter ranging from about 5.70 in. to about 6.10 in.

4. The system of claim 1, wherein the die outlet assembly produces the cylindrical foam article having a diameter ranging from about 3.70 in. to about 4.10 in.

5. The system of claim 1, wherein the die outlet assembly produces the cylindrical foam article having a diameter ranging from about 4.70 in. to about 5.10 in.

6. The system of claim 1, wherein the die outlet assembly further comprises:

a flow outlet coupled to the second end of the outlet adaptor, the flow outlet having an inner liner formed of the low friction material for contact with the cylindrical foam article; and at least one die outlet coupled to the flow outlet, the at least one die outlet including at least one lining formed of the low friction material for contact with the cylindrical foam article.

7. The system of claim 6, wherein the at least one die outlet further comprises:

a first die outlet having a first end coupled to the end of the outlet adaptor and a second end; and a second die outlet having a first end coupled to the second end of the first die outlet, wherein the substantially conical bore extends through the first and second die outlets, and wherein a diameter of the substantially conical bore increases as the substantially conical bore extends from an upstream end of the first die outlet to a downstream end of the second die outlet.

8. The system of claim 1, wherein the natural skin has a thickness of about 0.05 in. to about 0.25 in. about the circumference of the cylindrical foam article.

9. The system of claim 1, wherein the natural skin of the cylindrical foam article has a cell size of about 0.008 in. to about 0.04 in. and an interior of the cylindrical foam article has a cell size of about 0.04 in. to about 0.09 in.

10. A system for producing a cylindrical foam article comprising:

an extruder for continuously extruding a polymer having a die housing;

a die having a die flow channel extending from a first end to a second end of the die and releasably coupled to the die housing;

an outlet adaptor receivable within the die flow channel, wherein the outlet adaptor includes a first end a second end and an outlet flow channel defined from the first end to the second end of the outlet adaptor such that the first end of the outlet adaptor is shaped to cooperate with a shape of the die flow channel at the second end of the die to assist in retaining the outlet adaptor, and wherein a diameter of the outlet flow channel expands at the second end of the outlet adaptor to create a pressure drop to cause formation of the foamed article;

a flow outlet having a first end, the first end of the flow outlet coupled to the second end of the outlet adaptor, the flow outlet having an inner liner with a low friction surface for contacting the foam article, the low friction surface having a substantially conical shape; and a die outlet disposed downstream of the outlet adaptor and having an upstream end couplable to the second end of the flow outlet, the die outlet having a low friction lining for contacting the foam article, the low friction lining defining a substantially conical bore extending from the second end of the flow outlet through a downstream axial end of the die outlet, wherein the die outlet produces the cylindrical foam article having a natural skin about a circumference of the foam article.

11. The system of claim 10, wherein the natural skin has a thickness of about 0.05 in. to about 0.25 in. about the circumference of the cylindrical foam article.

12. The system of claim 10, wherein the natural skin of the cylindrical foam article has a cell size of about 0.008 in. to about 0.04 in. and an interior of the cylindrical foam article has a cell size of about 0.04 in. to about 0.09 in.

13. The system of claim 10, wherein the diameter of the cylindrical foam article ranges from between about 3.70 in. to about 8.10 in.

* * * * *